United States Patent [19]
Dyess

[11] Patent Number: 5,615,762
[45] Date of Patent: *Apr. 1, 1997

[54] CONVEYOR APPARATUS FOR COLLATING BAGGED PRODUCTS

[75] Inventor: William B. Dyess, Rowlett, Tex.

[73] Assignee: Dallas A.C. Horn & Co., Inc., Dallas, Tex.

[*] Notice: The term of this patent shall not extend beyond the expiration date of Pat. No. 5,495,932.

[21] Appl. No.: 572,109

[22] Filed: Dec. 14, 1995

Related U.S. Application Data

[63] Continuation of Ser. No. 208,644, Mar. 9, 1994, Pat. No. 5,495,932.

[51] Int. Cl.⁶ ................................................ B65G 47/22
[52] U.S. Cl. ..................... 198/464.1; 198/416; 414/798.8
[58] Field of Search ................................ 198/416, 431, 198/464.1; 414/794.4, 798.4, 798.5, 798.8

[56] References Cited

U.S. PATENT DOCUMENTS

| 1,366,874 | 1/1921 | Christians | 366/208 |
|---|---|---|---|
| 1,371,352 | 3/1921 | Christians | 366/349 |
| 1,916,838 | 7/1933 | Hiatt | 414/770 |
| 2,371,888 | 3/1945 | Hermani | 198/416 X |
| 3,388,812 | 6/1968 | Cooper | 414/770 |
| 3,700,127 | 10/1972 | Kurk et al. | 198/431 X |
| 4,356,906 | 11/1982 | Fallas | 198/413 |
| 4,583,351 | 4/1986 | Fallas | 53/501 |
| 4,718,534 | 1/1988 | Harper | 198/416 X |
| 4,864,801 | 9/1989 | Fallas | 53/446 |
| 4,966,652 | 10/1990 | Frye et al. | 414/794.4 X |
| 5,123,231 | 6/1992 | Fallas et al. | 53/493 |
| 5,186,600 | 2/1993 | Wokeck et al. | 414/794.4 X |

Primary Examiner—Karen B. Merritt
Assistant Examiner—Janice L. Krizek
Attorney, Agent, or Firm—Michael A. O'Neil

[57] ABSTRACT

In a conveyor apparatus, bagged food products fall from a first inclined belt onto a second horizontal belt. As they fall, the bagged food products engage a bar and flip forwardly onto the second belt. The bar has a friction enhancing covering which aids in pivoting the bagged food product onto the second belt, resulting in a properly collated array of bagged food products.

4 Claims, 3 Drawing Sheets

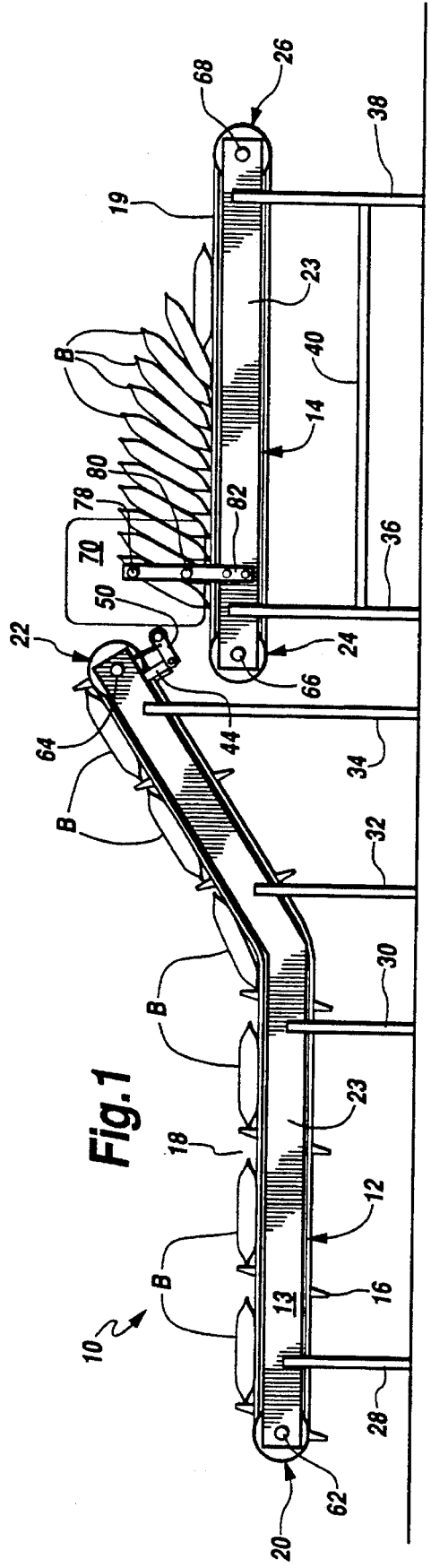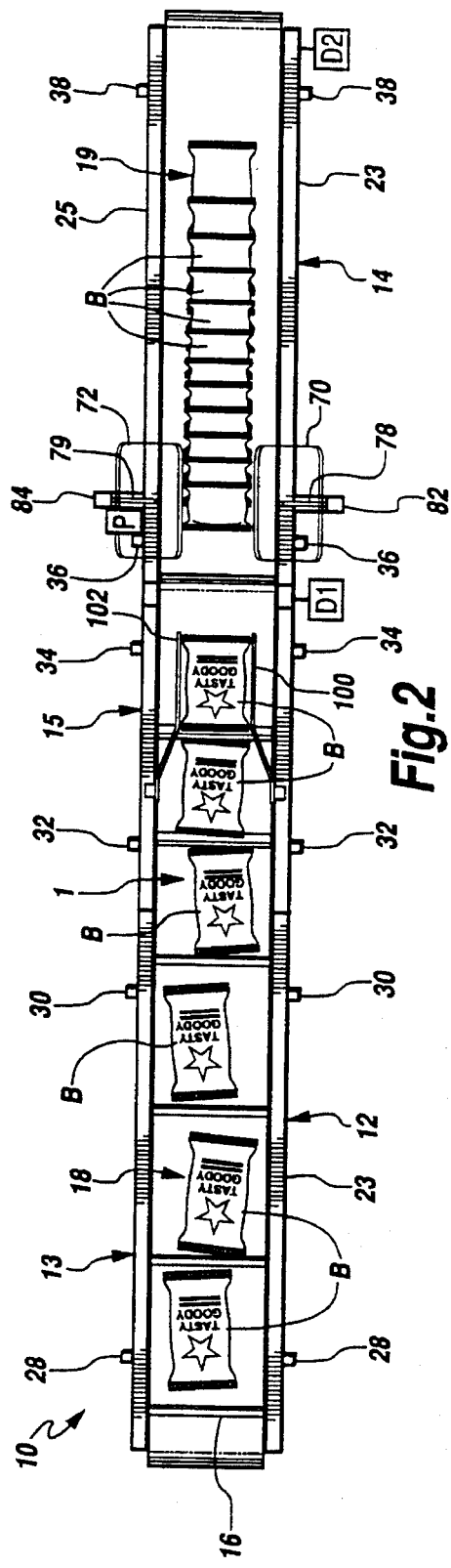

CONVEYOR APPARATUS FOR COLLATING BAGGED PRODUCTS

This is a Rule 1.60 continuation application of Ser. No. 08/208,644 filed Mar. 9, 1994, now U.S. Pat. No. 5,495,932.

TECHNICAL FIELD

The present invention generally relates to an apparatus for positioning bagged food products on a conveyor, and in particular, to a conveyor apparatus for collating bagged food products and thereby aiding in the transfer of the bagged food products into shipping cartons.

BACKGROUND AND SUMMARY OF THE INVENTION

In order to expedite the packing of individually bagged food products, such as potato chips, into shipping cartons, it is desirable to have the bagged food products in a vertically oriented array. The vertical orienting of bagged food products, known in the art as collating, allows for efficient transition of the bagged food product into shipping cartons.

Formerly, the process of gathering the bagged food products from conveyors and transferring them into shipping cartons was a tedious and time consuming task. The bagged food products were randomly spaced and horizontally positioned on the conveyor making it difficult to transfer the individually bagged food products from the conveyor into the shipping cartons.

U.S. Pat. No. 4,356,906 issued Nov. 2, 1982, to David M. Fallas, discloses a device that eliminates the difficult task of manually gathering and arranging the food product bags on the conveyor for transfer into the shipping cartons. However, the prior device was expensive and complicated. In contrast, the present invention achieves the same result in a less expensive and more efficient manner.

The present invention includes a first inclined portion of a conveyor system for elevating the food product bags and dropping them onto a second horizontal portion of the conveyor system. The first inclined portion of the conveyor system has a horizontal rubber coated bar for engaging the bagged food products and causing them to tip forwardly as they fall from the first inclined portion of the conveyor system onto the second horizontal portion of the conveyor system resulting in a properly collated array of bagged food packages for transfer into shipping cartons.

BRIEF DESCRIPTION OF DRAWINGS

A more complete understanding of the present invention may be had by reference to the following Detailed Description when taken in conjunction with the accompanying drawings wherein:

FIG. 1 is a right side view of a conveyor system incorporating the present invention;

FIG. 2 is a top view of the conveyor system of FIG. 1;

DETAILED DESCRIPTION

Figure 3:
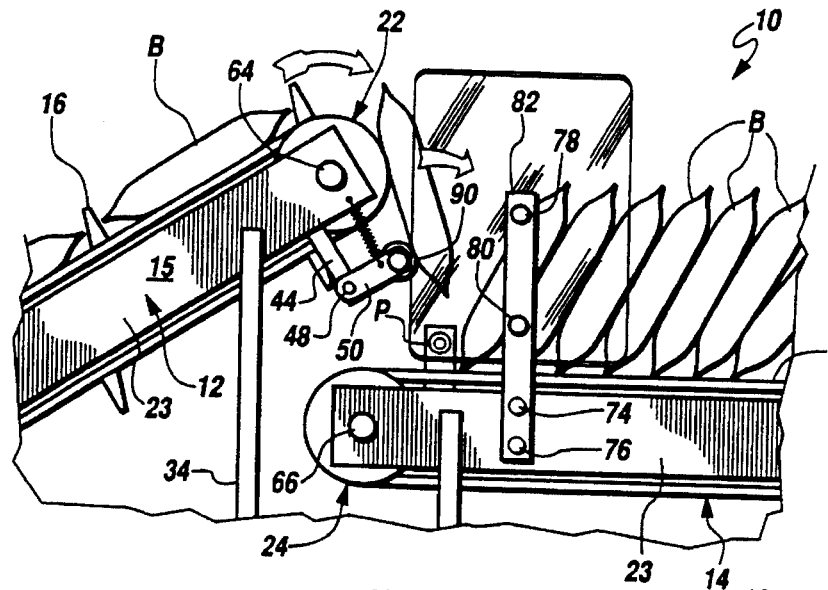
FIGS. 3, 4 and 5 are enlargements of a portion of FIG. 1 showing various steps in the operation of the conveyor system.

Referring now to the Drawings, and particularly to FIGS. 1 and 2, bagged food products B are collated by a conveyor system 10. The conveyor system 10 comprises a first frame 12 having a horizontal portion 13 and an inclined portion 15 and a second frame 14. The first and second frames 12, 14 consist of a right side 23 and a left side 25. The first frame 12 is supported by vertical legs 28, 30, 32 and 34 (it being understood that identical vertical legs are employed on the opposite side of the device) with vertical legs 28 and 30 supporting the horizontal portion 13 and vertical legs 32 and 34 supporting the inclined portion 15 of the first frame 12.

A first roller 20 and a second roller 22 are located at opposite ends of the first frame 12. The first roller 20 is rotatably supported on the first frame 12 by a first shaft 62, and the second roller 22 is rotatably supported on the first frame 12 by a second shaft 64. A first belt 18 encircles the first roller 20 and the second roller 22. The bagged food products B on the first frame 12 of the conveyor system 10 are placed on the first belt 18 and are separated by flights 16. A drive mechanism D1 moves the first belt 18 around the first roller 20 and the second roller 22 and thereby transports the bagged food products B rightwardly (FIG. 1) and upwardly along the inclined portion 15 of the first frame 12.

Figure 6:
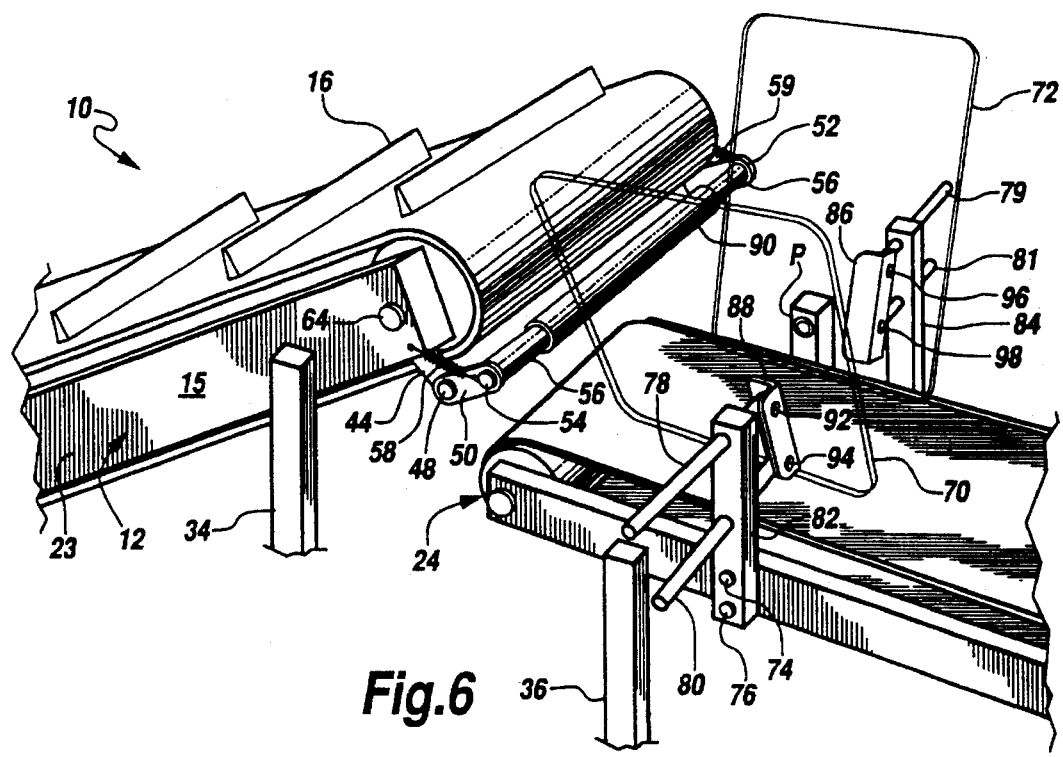
FIG. 6 is a partial perspective of the conveyor system of FIG. 1.

Referring to FIGS. 1 and 6, a first arm 44 is connected to the inclined portion 15 of the right side 23 of the first frame 12 near the second roller 22. A similar arm is connected to the inclined portion 15 of the left side 25 of the first frame 12. A first finger 50 is pivotally connected to the first arm 44 by means of a pin 48, and a second finger 52 is pivotally connected to its associated arm by means of a similar pin. A bar 56 is connected to the ends of the first finger 50 and second finger 52 by means of a shaft 54. A first spring 58 is connected between the inclined portion 15 of the right side 23 of the first frame 12 and the first finger 50. A second spring 59 is similarly connected between the second finger 52 and the left side 25 of first frame 12. The pivotal connection of the first finger 50 and the first arm 44 on the right side 23 of frame 12 and the identical configuration on the left side 25 of frame 12 along with the first and second springs 58 and 59 provide a safety mechanism that allows for movement of the bar 56 if a foreign object, such as a hand, is trapped between the first belt 18 and the bar 56.

A second frame 14 of the conveyor system 10 consists of a right side 23 and a left side 25 and is supported by vertical legs 36 and 38. The tops of the vertical legs 36 and 38 are secured to the second frame 14. The bottoms of the vertical legs 36 and 38 are braced by a horizontal leg 40 (it being understood that identical vertical and horizontal legs are employed on the opposite side of the device).

A third roller 24 and a fourth roller 26 are located at opposite ends of the second frame 14. The third roller 24 is rotatably supported on the second frame 14 by a third shaft 66 and the fourth roller 26 is rotatably supported on the second frame 14 by a fourth shaft 68. A second belt 19 encircles the third roller 24 and the fourth roller 26. The bagged food products B are received on the second belt 19 and are detected by a photosensor P. A drive mechanism D2 moves the second belt 19 around the third roller 24 and the fourth roller 26. In one embodiment of the invention, the first belt 18 is operated continuously to sequentially drop bagged food products B onto the second belt 19. Each bagged food product B is detected by the photosensor P which activates the drive mechanism D2 to move the second belt 19 a predetermined increment and thereby move the collated bagged food products B rightwardly (FIG. 1).

FIG. 2 illustrates elbows 100 and 102 that assist in the alignment of the bagged food products B as they proceed up the inclined portion 15 of the first frame 12 of the conveyor system 10 under the action of the belt 18.

Figure 4:
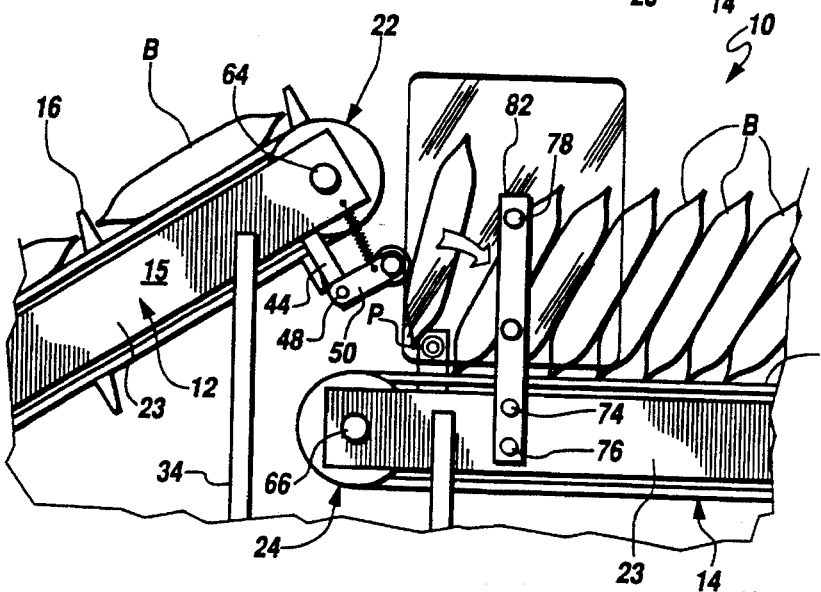
Figure 5:
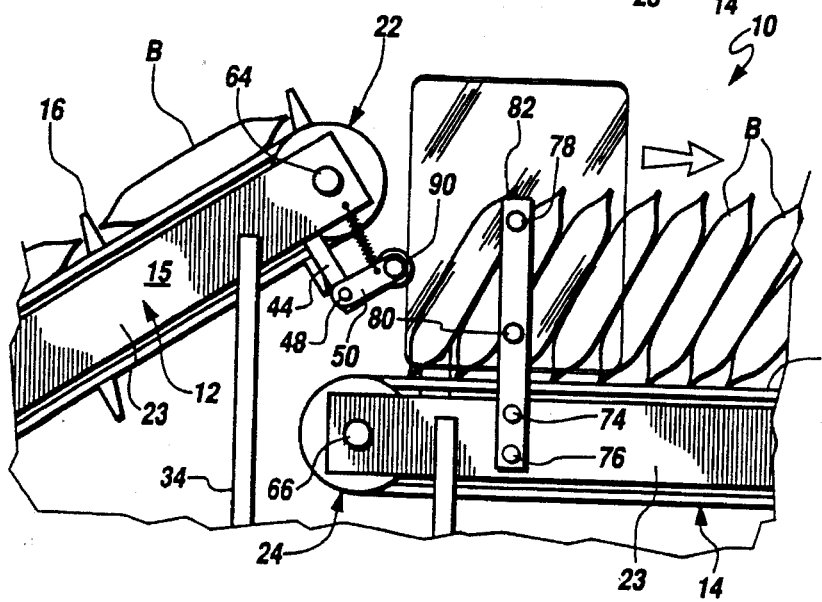

FIGS. 3, 4 and 5 illustrate the operational sequence of the conveyor system 10 as the bagged food products B fall from the first belt 18 to the second belt 19 of the conveyor system 10. FIG. 3 shows one of the bagged food products B as it simultaneously contacts the second roller 22 and the bar 56. FIG. 4 shows how the bar 56 aids in flipping each bagged food product B forwardly as it falls from the first belt 18 onto the second belt 19. FIG. 5 shows the bagged food products B properly collated on the second belt 19 of the conveyor system 10.

Near the vertical leg 36 is an extension 82 with the lower portion of the extension 82 attached to the right side 23 of the second frame 14 by an upper bolt 74 and a lower bolt 76 and the upper portion of the extension 82 supporting a shield 70. FIG. 6 illustrates the shields 70 and 72 attached to the extensions 82 and 84, respectively. The shield 70 is attached to the bracket 88 which in turn is attached to the arms 78 and 80 of the extension 82 by means of fasteners 92 and 94. Similarly, the shield 72 is attached to bracket 86 which in turn is attached to the arms 79 and 81 of the extension 84 by means of fasteners 96 and 98.

Figure 7:
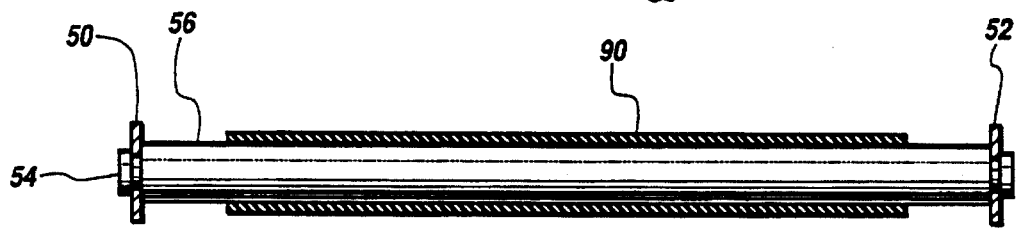
FIG. 7 is a sectional view of a portion of the conveyor system of FIG. 1.

FIG. 7 shows friction enhancing material 90 covering the bar 56 attached at the end of the first frame 12 of the conveyor system 10. Material 90 may be synthetic rubber, or any of various plastic materials. The material 90 ensures proper operation of the conveyor system 10 as illustrated in FIGS. 3, 4 and 5.

Figure 8:
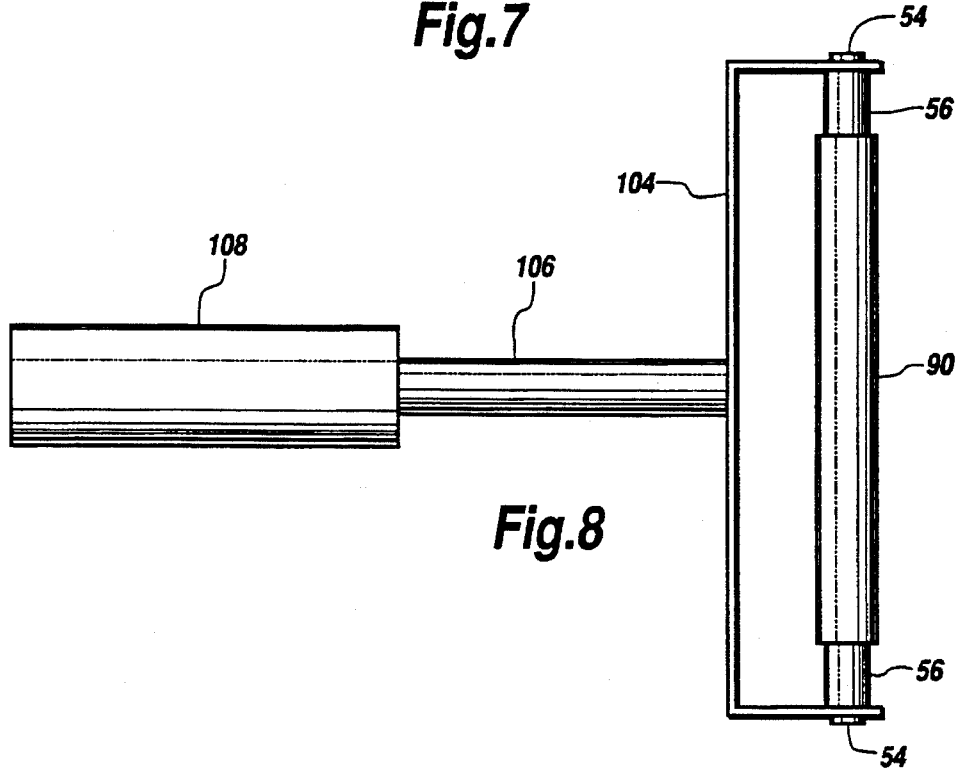
FIG. 8 is a diagrammatical illustration of a second embodiment of the invention.

A second embodiment of the invention is illustrated in FIG. 8. The bar 56 having the material 90 may be mounted on a yoke 104 which is in turn mounted on the piston rod 106 of a cylinder 108. It has been found that in certain instances the operation of the present invention as illustrated in FIGS. 3, 4, and 5 may not cause proper collation of the bagged food products B. In such instances, the cylinder 108 may be actuated to advance the piston rod 106 and therefore the bar 56 thereby causing a misaligned bagged food product B to be properly collated as illustrated in FIG. 1.

Although the specific embodiment of the present invention has been illustrated in the accompanying drawings and described in the foregoing Detailed Description, it will be understood that the invention is not limited to the embodiment disclosed, but may be modified without departing from the scope of the invention as set forth and defined by the following claims.

I claim:

1. A conveyor apparatus comprising:

an inclined conveyor portion having a discharge end from which bagged food products are dropped;

a horizontal conveyor portion disposed beneath the discharge end of the inclined conveyor portion for receiving the dropped bagged food products; and a cylinder, normally fixedly positioned between the inclined conveyor portion and the horizontal conveyor portion, for engaging the bagged food products as they fall from the inclined conveyor portion and flipping the bagged food products forward such that bagged food products land in a substantially upright position on the horizontal conveyor portion, thereby collating them.

2. The apparatus in claim 1, wherein said cylinder has a friction enhancing coating that aids in flipping the bagged food products forward.

3. The apparatus in claim 1, further including a safety device for displacing the cylinder if a foreign object is caught between the inclined conveyor portion and the cylinder.

4. The conveyor apparatus of claim 1 further including a photosensing means for determining when the bagged products are received on the horizontal conveyor portion and controlling movement of the horizontal conveyor portion.

\* \* \* \* \*